Patented June 5, 1923.

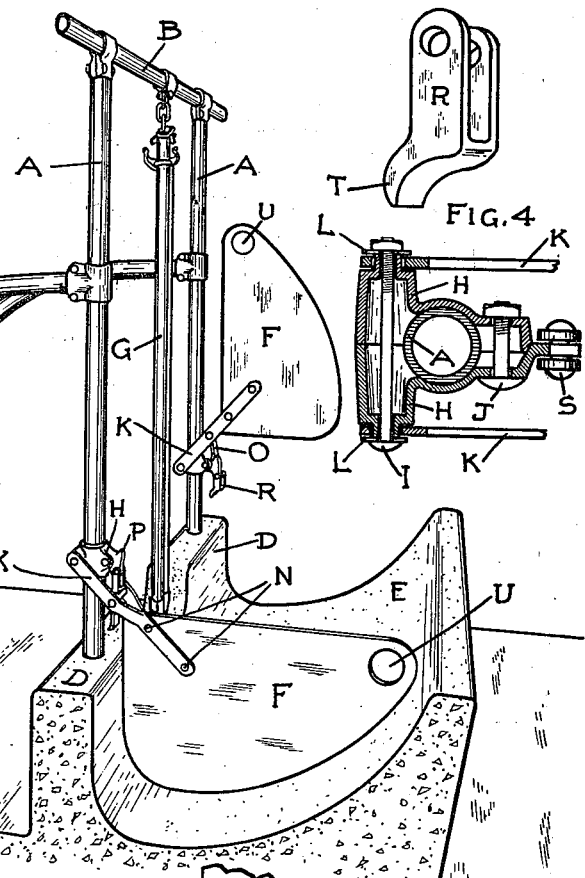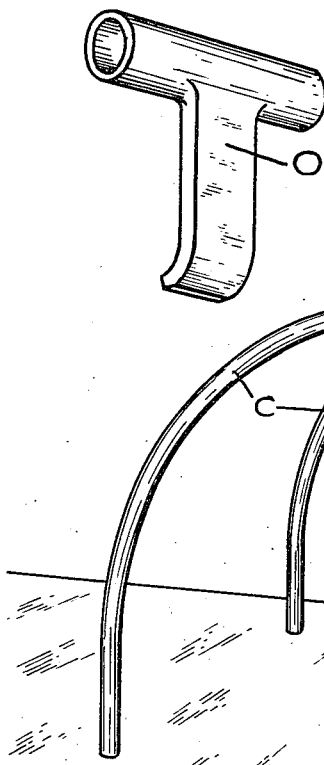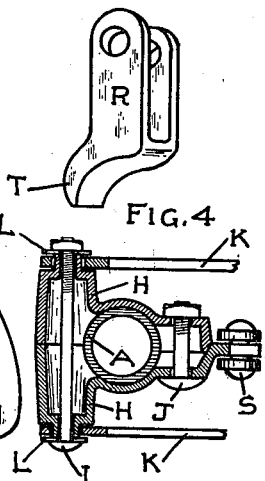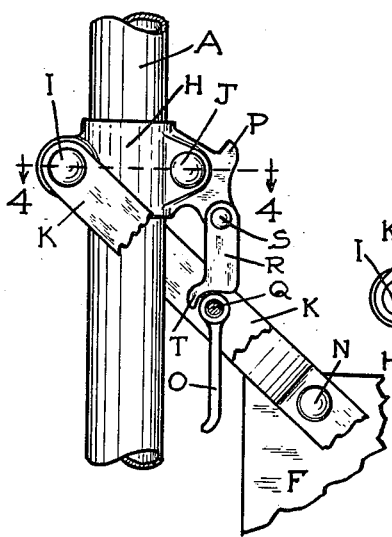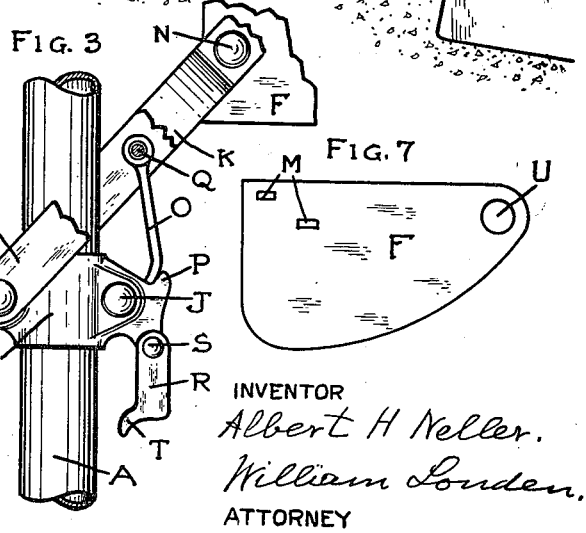

1,457,850

UNITED STATES PATENT OFFICE.

ALBERT H. NELLER, OF FAIRFIELD, IOWA, ASSIGNOR TO THE LOUDEN MACHINERY COMPANY, OF FAIRFIELD, IOWA, A CORPORATION OF IOWA.

DIVISION FOR ANIMAL MANGERS.

Application filed February 9, 1922. Serial No. 535,173.

*To all whom it may concern:*

Be it known that I, ALBERT H. NELLER, a citizen of the United States, residing at Fairfield, in the county of Jefferson and State of Iowa, have invented a new and useful Improvement in Divisions for Animal Mangers, of which the following is a specification.

My invention relates to divisions to separate the manger into separate compartments so that each animal may have the free use of its own compartment and will be prevented from consuming the feed of its neighbor, or otherwise interfering therewith, and it consists of a series of members hinged independently to adjacent stall frames, and arranged to be locked and held in lowered position in the manger, to divide it into compartments. Also to be locked in elevated position to facilitate cleaning and for other requirements. Also in certain improvements in the details of construction which will be described herein and will be more definitely set forth in the claims.

Referring to the drawings which form a part of this specification, Fig. 1 is a perspective of a section of animal stalls and a manger having division members embodying the features of my invention. Fig. 2 is an enlarged view of a portion of one of the stall posts and a portion of one of the division members in lowered position, together with the connections partially broken away. Fig. 3 is the same showing the portion of the division members in elevated position. Fig. 4 is a horizontal section on line 4—4 of Fig. 2. Figs. 5, 6 and 7 are detail views.

Referring to the drawing, A represents the upright posts, B the top rail and C the partitions of a section of animal stalls. D is the manger curb in which the posts A are set, and E is the manger adjoining the curb. The division members are represented by F and are preferably made of heavy sheet metal plates having their lower edges formed to fit the contour of the inner portion of the manger. G represents an animal stanchion which is connected to the top rail B between the posts A, and its lower end is preferably anchored to a portion of the curb between the posts.

H represents a hinge casting applied to the stall post. It is preferably made in two mating parts, as most plainly shown in Fig. 4, and is clamped upon the post by bolts I and J. The portions of the castings through which the bolt I passes are extended out some distance beyond the sides of the post and are preferably provided with bosses over which the ends of hinge irons K are pivoted, said irons being held in position thereon by washers L placed on the bosses and through which washers the bolt I is passed.

The other ends of the hinge irons are bent in toward each other so as to embrace the division member F between them. These inner ends of the hinge irons are fitted with bolt holes to correspond with slotted holes M in the division member F through which bolts N are passed. By means of the slotted holes M the division may be adjusted to fit the transverse contour of the manger which may be shifted by the varying thicknesses of the manger curb in which the posts A are set, or by the posts being set different distances from the inner side of the curb.

To hold the division member in elevated position a swinging dog O is pivoted between the hinge irons near their centers, which when the member is elevated will engage a catch P on an adjacent portion of the hinge casting H. This dog is preferably made with a horizontally extended upper end having an opening through it as shown in Fig. 5. A bolt, a rod or a rivet Q is passed through this opening and also through holes in central portions of the hinge irons, so the dog will hang in position to automatically engage the catch P and hold the division member in elevated position. To lower the member the dog is simply disengaged from the catch P in any suitable manner.

To hold the division member in lowered position a swinging hold-down dog R is pivoted to a portion of the hinge casting H, preferably below the catch P, by means of a bolt or rivet S, so the dog will automatically swing over the extended upper portion of the hold-up dog O when the member is in lowered position, and will thus prevent the animal from rooting or nosing the member up from said lowered position. Preferably the dog R is provided with a downwardly and backwardly pointing projection T, as shown in Figs. 2, 3 and 6. The pivoted ends of the hinge irons being held some distance apart by the extended pivots on the hinge castings, will brace the irons and the division member to which the irons are attached, against lateral displacement.

In order to assist the operator in raising and lowering the division member, an opening U forming a hand hold is cut in its free end whereby the operator will have better control of the member than if he had to depend upon grasping the edge of the member in the usual way. The device is extremely simple and easily operated. All that is necessary to change it from one position to the other is to push the holding dog from its normal holding position and then move the member to the other position when it will be automatically and positively locked in that position by the appropriate dog, and it cannot be shifted from that position until the holding dog is pushed out of the way.

What I claim is:

1. In manger divisions for animal stalls, the combination of a division member adapted to fit the transverse contour of the manger, said member being hinged to a portion of the stall frame, and adapted to be elevated and lowered thereon, and pivoted locking means to alternately and automatically lock the division member in elevated and in lowered position.

2. In manger divisions for animal stalls, the combination of a division member adapted to fit the transverse contour of the manger, a hinge casting connected to a portion of the stall frame, hinge irons pivotally secured at one end to the hinge casting, and at the other end secured to a portion of the division member and adjacent thereto, a catch on the hinge casting, a swinging dog pivoted on the hinge irons and adapted to automatically engage the catch and hold the division member in elevated position, and a second swinging dog pivoted to the hinge iron and adapted when the division member is in lowered position to hold it locked down in that position.

3. In manger divisions for animal stalls, the combination of a division member adapted to fit the transverse contour of the manger, a hinge casting connected to a portion of the stall frame, hinge irons pivotally secured at one end to the hinge casting, and at the other end secured to a portion of the division member and adjacent thereto, a catch on the hinge casting, a swinging dog pivoted on the hinge irons and adapted to automatically engage the catch and hold the division member in elevated position, and a second swinging dog pivoted to the hinge iron and adapted when the division member is in lowered position to catch on the first named dog and hold in that position.

4. In manger divisions for animal stalls, the combination of a division member adapted to fit the transverse contour of the manger, a hinge casting connected to a portion of the stall frame, hinge irons pivotally secured at one end to the hinge casting, and at the other end secured to a portion of the division member and adjacent thereto, a catch on the hinge casting, a swinging dog pivoted on the hinge irons and adapted to automatically engage the catch and hold the division member in elevated position, and a second swinging dog pivoted to the hinge iron below the catch, and adapted when the division member is in lowered position to hold it in that position.

5. In manger divisions for animal stalls, the combination to a division member adapted to fit the transverse contour of the manger, a hinge casting connected to a portion of the stall frame, hinge irons pivotally secured at one end to the hinge casting, and at the other end adjustably secured to a portion of the division member and adjacent thereto, a catch on the hinge casting, a swinging dog pivoted on the hinge irons and adapted to automatically engage the catch and hold the division member in elevated position, and a second swinging dog pivoted to the hinge iron and adapted when the division member is in lowered position to hold it locked down in that position.

6. In manger divisions for animal stalls, the combination of a division member adapted to fit the transverse contour of the manger, a hinge casting consisting of two parts clamped upon a portion of the stall frame, each having laterally extended mating portions with an opening there through, bosses on the ends of the extended portions surrounding the opening, a pair of hinge irons pivotally connected at one of their ends to the bosses, and their other ends secured to opposite sides of an adjacent portion of the division member, a washer on each of the bosses outside of the hinge irons, and a bolt passed through the washers and through the opening in the extended portions of the hinge castings, whereby the pivoted ends of the hinge irons will be securely held in a widely extended position.

Fairfield, Iowa, February 7, 1922.

ALBERT H. NELLER.